(12) United States Patent
Chen et al.

(10) Patent No.: US 12,670,882 B1
(45) Date of Patent: Jun. 30, 2026

(54) INTERACTIVE DISPLAY DEVICE AND METHOD

(71) Applicant: Wistron Corporation, New Taipei City (TW)

(72) Inventors: Feng Yuan Chen, New Taipei City (TW); Kang Ming Peng, New Taipei City (TW); Guan Wei Pan, New Taipei City (TW); Kuo Chi Chien, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 0 days.

(21) Appl. No.: 19/231,589

(22) Filed: Jun. 9, 2025

(30) Foreign Application Priority Data

May 12, 2025 (TW) ................................. 114117770

(51) Int. Cl.
*G09G 5/00* (2006.01)
*G06F 3/14* (2006.01)
*G06T 7/20* (2017.01)

(52) U.S. Cl.
CPC .......... *G09G 5/006* (2013.01); *G06F 3/1454* (2013.01); *G06T 7/20* (2013.01); *G09G 2330/022* (2013.01)

(58) Field of Classification Search
CPC .... G09G 5/006; G09G 3/2096; G06F 3/1454; G06F 1/1686; G06F 1/3231; A47G 1/02; G02B 5/08; H04N 7/15; H04N 5/2624
See application file for complete search history.

(56) References Cited

U.S. PATENT DOCUMENTS

| | | | | |
|---|---|---|---|---|
| 2007/0040033 | A1* | 2/2007 | Rosenberg ............ | G06F 3/0481 |
| | | | | 235/462.36 |
| 2018/0343418 | A1* | 11/2018 | Van Ness ................ | H04N 7/147 |
| 2021/0149441 | A1* | 5/2021 | Bartscherer ........... | G06F 1/1605 |
| 2023/0314846 | A1 | 10/2023 | Shi et al. | |

FOREIGN PATENT DOCUMENTS

| | | |
|---|---|---|
| TW | 202405514 | 2/2024 |

* cited by examiner

*Primary Examiner* — Priyank J Shah
(74) *Attorney, Agent, or Firm* — JCIPRNET

(57) ABSTRACT

An interactive display device and an interactive display method that are capable of increasing user experience and user privacy are provided. The interactive display device includes an image sensor, an interface circuit, and a display. The image sensor generates a first image signal. The interface circuit transmits a second image signal from an electronic device. The display sets an operation status of the interface circuit according to a user presence signal and the second image signal. Based on the operation status, the display displays an output image according to at least one of the first image signal and the second image signal.

20 Claims, 7 Drawing Sheets

INTERACTIVE DISPLAY DEVICE AND METHOD

CROSS-REFERENCE TO RELATED APPLICATION

This application claims the priority benefit of Taiwan application serial no. 114117770, filed on May 12, 2025. The entirety of the above-mentioned patent application is hereby incorporated by reference herein and made a part of this specification.

BACKGROUND

Technical Field

The disclosure relates to a display device, and particularly relates to an interactive display device and method.

Description of Related Art

Generally, a computer can capture images through a camera that is either built into or externally connected to a display, and use the images when running applications. Such applications may include, for instance, video conferencing or magic mirror displays that provide real-time visual output. However, current displays cannot directly display the images and must rely on the computer to operate the camera for the display to perform display functions, which causes inconvenience in use.

On the other hand, since the computer has access to images captured by the camera, when users are unwilling to provide such images, the display must physically block the lens using an object to achieve this purpose. As such, current displays not only fail to adequately protect user privacy but are also aesthetically compromised and detract from the overall user experience due to the presence of the blocking object.

SUMMARY

One or more embodiments of the disclosure provide an interactive display device, which can flexibly display images captured by an image sensor, thereby enhancing user experience and user privacy.

The interactive display device provided in one embodiment of the disclosure includes an image sensor, an interface circuit, and a display. The image sensor is configured to generate a first image signal. The interface circuit is coupled to an electronic device and configured to transmit a second image signal from the electronic device. The display is coupled to the image sensor and the interface circuit. The display is configured to set an operation status of the interface circuit according to a user presence signal and the second image signal. The display is configured to display an output image based on the operation status according to at least one of the first image signal and the second image signal.

An interactive display method is further provided in one embodiment of the disclosure. The interactive display method includes following steps. A first image signal is generated by an image sensor. A second image signal is transmitted from an electronic device by an interface circuit. An operation status of the interface circuit is set by a display according to a user presence signal and the second image signal. An output image is displayed by the display based on the operation status according to at least one of the first image signal and the second image signal.

In view of the above, in the interactive display device and the interactive display method provided in one or more embodiments of the disclosure, whether a user is present and whether an image output from the electronic device is present are detected by the display, and the operation status of the interface circuit is spontaneously set to prohibit the electronic device from accessing images captured by the image sensor through the interface circuit, thereby reducing user privacy concerns. In addition, based on the set operation status, the interactive display device can flexibly display image signals from multiple sources as output images, independent of the operation of the electronic device, thereby improving user experience and convenience of use.

To make the above features and advantages of the disclosure clearly understandable, embodiments are specifically provided below, with detailed explanations in conjunction with the accompanying drawings as follows.

DESCRIPTION OF THE EMBODIMENTS

Some embodiments of the disclosure will be described in detail with reference to the accompanying drawings. In the following description, when the same reference numbers appear in different drawings, they will be regarded as the same or similar components. These embodiments are only a part of the disclosure and do not reveal all possible implementation manner of the disclosure. More precisely, these embodiments simply serve as examples within the scope of the claims of the disclosure.

Figure 1:
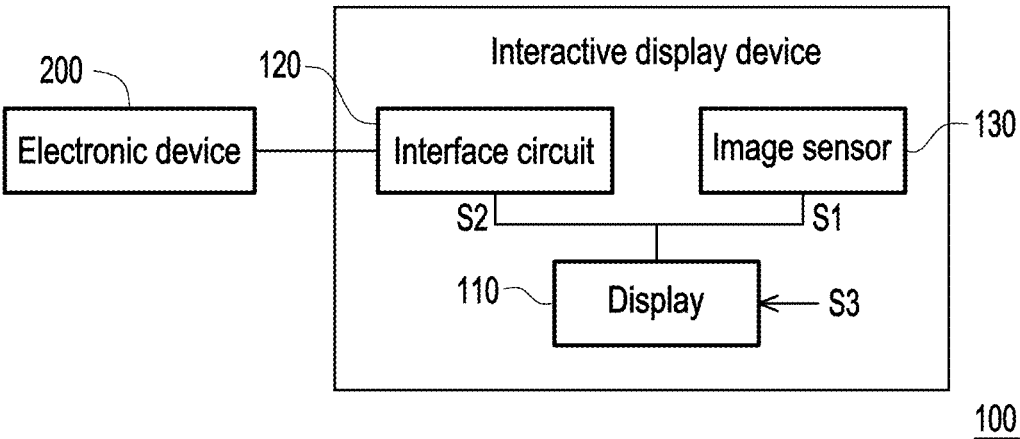
FIG. 1 is a circuit block diagram illustrating an interactive display device according to an embodiment of the disclosure.

FIG. 1 is a circuit block diagram illustrating an interactive display device according to an embodiment of the disclosure. With reference to FIG. 1, based on an operation status of an interactive display device 100, the interactive display device 100 can display an output image according to display signals from multiple sources. The interactive display device 100 can interact with a user to display an interactive screen. The interactive display device 100 can be connected to a host to display a computer screen and can also simultaneously display the interactive screen.

In the embodiment depicted in FIG. 1, the interactive display device 100 includes a display 110, an interface circuit 120, and an image sensor 130. The interface circuit 120 is coupled to the display 110. The interface circuit 120 is further configured to be coupled to an electronic device 200. The interface circuit 120 can be, for instance, an interface circuit compliant with Universal Serial Bus (USB) specifications. The electronic device 200 can be, for instance, a host device, such as a mobile phone, a tablet computer, a laptop computer, or a desktop computer.

The image sensor 130 is coupled to the display 110. The image sensor 130 can be, for instance, be a camera or another sensor with a photography function. The display 110 can be, for instance, a display device providing a display function, such as a liquid crystal display (LCD), a light-emitting diode (LED), and an organic light-emitting diode (OLED).

Figure 2:
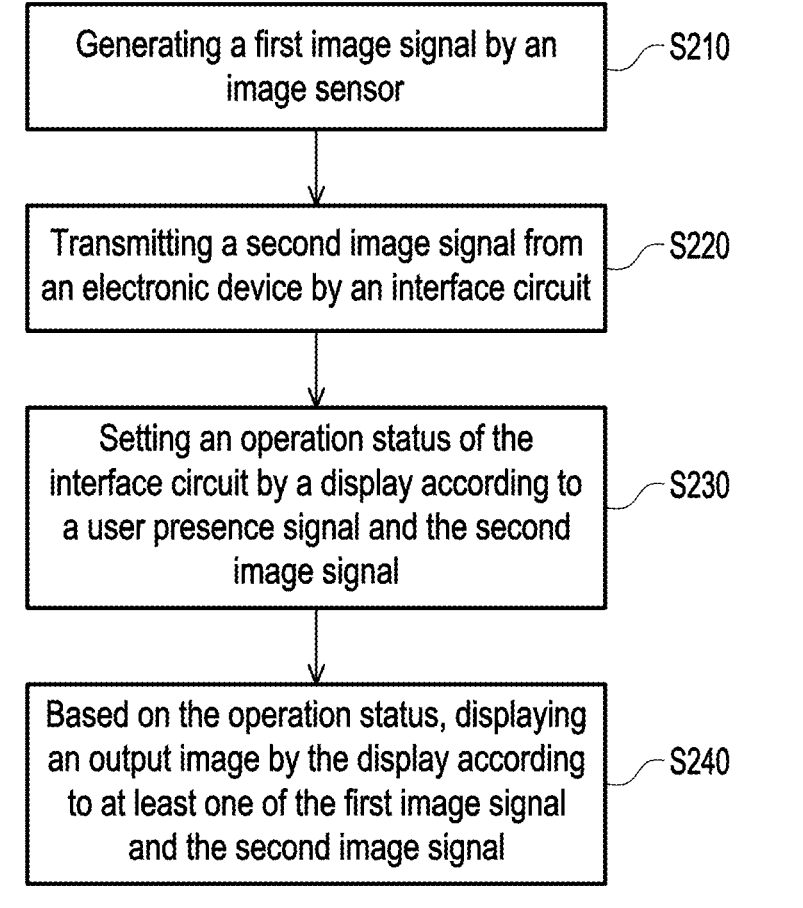
FIG. 2 is a flowchart of an interactive display method according to an embodiment of the disclosure.

FIG. 2 is a flowchart of an interactive display method according to an embodiment of the disclosure. With reference to FIG. 1 and FIG. 2, the interactive display device 100 performs steps S210 to S240 to achieve the interactive display method. The sequence of these steps S210 to S240 is simply provided for illustrative purposes.

In step S210, the image sensor 130 generates a first image signal S1 and outputs the first image signal S1 to the display 110. The first image signal S1 is an image captured by a lens of the image sensor 130 and can, for instance, include a user image.

In step S220, the interface circuit 120 transmits a second image signal S2 from the electronic device 200. The second image signal S2 is an image output by the electronic device 200 and can, for instance, include a video image. The display 110 receives the second image signal S2 through the interface circuit 120. In addition, the display 110 further receives a user presence signal S3 through another sensor (e.g., a presence sensor). The user presence signal S3 indicates whether a user is present (or in proximity) relative to the interactive display device 100.

In step S230, the display 110 sets the operation status of the interface circuit 120 according to the user presence signal S3 and the second image signal S2. That is, the display 110 considers whether the user is present or not and also considers whether the image signal S2 is received. The display 110 spontaneously sets (e.g., enables or disables) the operation status of the interface circuit 120 based on these various considerations.

In step S240, the display 110, based on the operation status set in step S230, an output image is displayed according to at least one of the first image signal S1 and the second image signal S2. That is, based on the operation status, the display 110 uses the image captured by the image sensor 130 (i.e., the first image signal S1) and/or the image output by the electronic device 200 (i.e., the second image signal S2) as the output image.

In some application scenarios, based on the presence of the user and the absence of the second image signal S2, the display 110 can, for instance, set the operation status of the interface circuit 120 to be disabled. As such, the electronic device 200 is prohibited from accessing components (including the image sensor 130) in the interactive display device 100 through the interface circuit 120. The display 110 can use the first image signal S1 captured by the image sensor 130 as the output image, thereby achieving a magic mirror display application.

In some other application scenarios, based on the simultaneous presence of the user and the second image signal S2, the display 110 can, for instance, set the operation status of the interface circuit 120 to be enabled. As such, the electronic device 200 can use the image sensor 130. Simultaneously, the display 110 can use the first image signal S1 and the second image signal S2 output by the electronic device 200 as the output image, thereby achieving a video conferencing application.

It is worth mentioning that, through detecting whether the user is present and whether the image signal S2 output by the electronic device 200 is present by the display 110, the interactive display device 100 can spontaneously set (including disable or enable) the operation status of the interface circuit 120. As such, based on the operation status, the electronic device 200 is prohibited or allowed to access the image sensor 130 to ensure user privacy. The interactive display device 100 can also flexibly display the image signals S1 and S2 from multiple sources as the output image in various application scenarios without being limited by the operation of the electronic device 200, thereby improving user experience and convenience of use.

Figure 3:
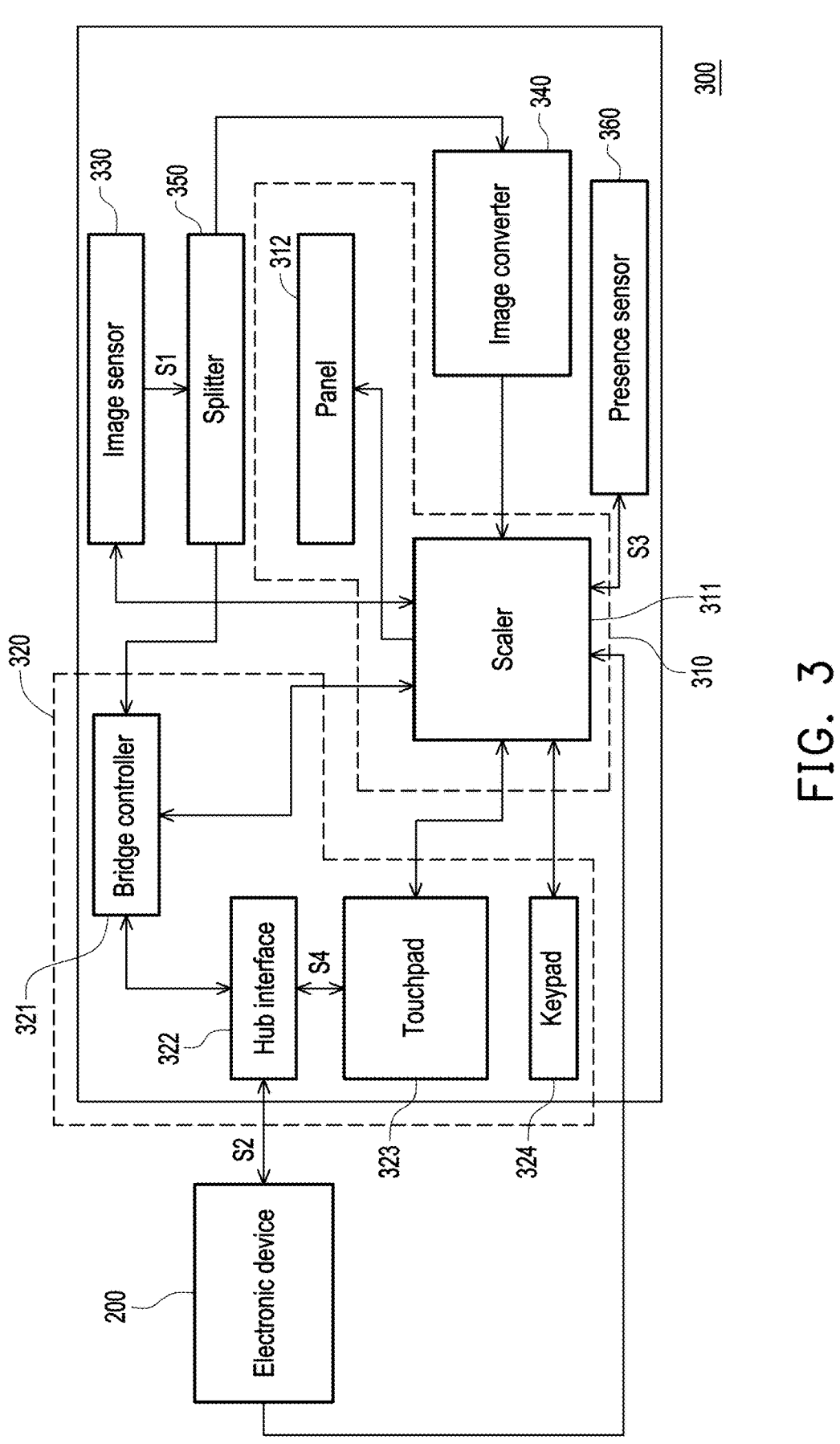
FIG. 3 is a circuit block diagram illustrating an interactive display device according to another embodiment of the disclosure.

FIG. 3 is a circuit block diagram illustrating an interactive display device according to another embodiment of the disclosure. With reference to FIG. 3, the interactive display device 300 is configured to connect the electronic device 200. The interactive display device 300 includes a display 310, an interface circuit 320, and an image sensor 330. The display 310, the interface circuit 320, and the image sensor 330 can be understood by referring to the related descriptions of the interactive display device 100.

In the embodiment depicted in FIG. 3, the display 310 includes a scaler 311 and a panel 312. The panel 312 is coupled to the scaler 311 through a panel communication interface (I/F), and the panel 312 is configured to display the output image.

The scaler 311 is coupled to the image sensor 330 through a communication interface (Comm I/F). The scaler 311 is further coupled to the electronic device 200 through a video interface (video I/F). The scaler 311 is configured to synchronize the signals S1 to S4 from multiple sources and provide the output image to the panel 312, thereby ensuring the operational performance of the display 310. The scaler 311 can be, for instance, a circuit with functions of scaling images, driving display images, and various computations and determinations, for instance, and the scaler 331 can be, for instance, implemented in form of an integrated circuit.

Moreover, the interface circuit 320 includes a bridge controller 321, a hub interface 322, and at least one input interface 323 and 324. The input interface 323 can be, for instance, a touchpad. The input interface 324 can be, for instance, a keypad. The input interfaces 323 and 324 are coupled to the hub interface 322 through a USB transmission interface. The input interfaces 323 and 324 can serve as interfaces for interactions between the interactive display device 300 and the user. The input interfaces 323 and 324 are configured to receive user inputs to generate a user input signal S4 and output the user input signal S4 to the hub interface 322.

The hub interface 322 can be, for instance, a USB hub interface. The hub interface 322 is coupled to the bridge controller 321 through a USB transmission interface and further coupled to the electronic device 200 through a USB transmission interface to receive a second image signal S2. The hub interface 322 is configured to transmit the user input signal S4 and the second image signal S2 to the bridge controller 321. The bridge controller 321 can be, for instance, a USB bridge controller. The bridge controller 321 is further coupled to the scaler 311 through a Comm I/F. The bridge controller 321 is configured to communicate between the hub interface 322 and other components in the interactive display device 300.

In the embodiment depicted in FIG. 3, the interactive display device 300 further includes an image converter 340, a splitter 350, and a presence sensor 360. The splitter 350 is coupled to the image sensor 330, the bridge controller 321, and the image converter 340 through a mobile industry processor interface (MIPI). The splitter 350 can be, for instance, a 1:2 splitter. The splitter 350 is configured to receive the first image signal S1 generated by the image sensor 330 and distribute the first image signal S1 to different outputs. The outputs include the bridge controller 321 in the interface circuit 320 and the image converter 340. The image converter 340 is further coupled to the scaler 311 through a video I/F. The image converter 340 is configured to transmit the first image signal S1 to the scaler 311 according to a plurality of image formats.

Moreover, the presence sensor 360 is coupled to the scaler 311 in the display 310 through a Comm I/F. The presence sensor 360 is configured to sense whether a user is present (or in proximity to) the interactive display device 300 and further sense the proximity between the user and the interactive display device 300 to generate the user presence signal S3. The scaler 311 can automatically adjust the contextual display settings of the panel 312 based on the proximity.

It should be noted that the scaler 311 determines whether the interface circuit 320 is connected to the electronic device 200. Based on the determination result, the scaler 311 sets the operation status of the interface circuit 320 according to the user presence signal S3 and the second image signal S2. Specifically, the scaler 311 receives communication information between the bridge controller 321 and the interactive display device 300 and determines whether the electronic device 200 is connected to the interactive display device 300 according to the communication information. Based on the determination result, the scaler 311 sets the operation status by enabling or disabling the bridge controller 321 to prohibit or allow the electronic device 200 to access the image sensor 330 through the bridge controller 321.

Figure 4:
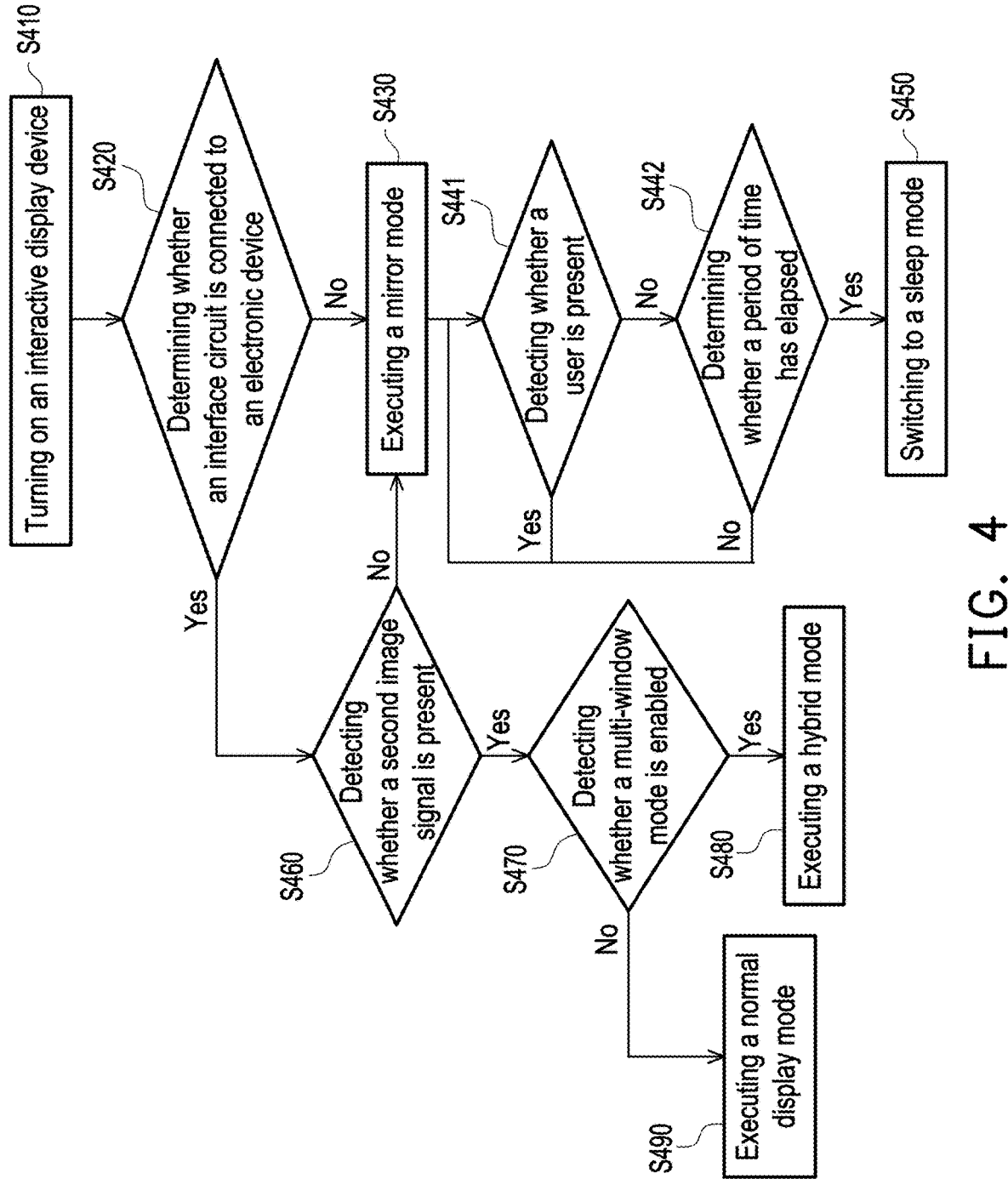
FIG. 4 is a flowchart of an interactive display method according to the embodiment depicted in FIG. 3.

FIG. 4 is a flowchart of an interactive display method according to the embodiment depicted in FIG. 3. With reference to FIG. 3 and FIG. 4, the interactive display device 300 performs steps S410 to S490 through the scaler 311 in the display 310 to achieve the interactive display method. The sequence of these steps S410 to S490 is simply provided for illustrative purposes.

In step S410, the interactive display device 300 is turned on. Alternatively, the interactive display device 300 is awakened when the presence sensor 360 detects the presence of a user.

In step S420, the bridge controller 321 transmits communication information between itself and the interactive display device 300 to the scaler 311. The scaler 311 determines whether the interface circuit 320 is connected to the electronic device 200 according to the communication information.

In step S430, when the interface circuit 320 is not connected to the electronic device 200, the scaler 311 executes a mirror mode. In the mirror mode, the scaler 311 performs steps S441 to S442 and S450 to spontaneously determine whether to terminate the application displayed on the magic mirror, thereby achieving power-saving effects. In the mirror mode, the scaler 311 detects whether a user is present through the presence sensor 360 over a period of time to determine whether to switch from the mirror mode to a sleep mode according to the user presence signal S3.

In step S441, the presence sensor 360 detects whether a user is present to generate the user presence signal S3. The scaler 311 determines whether the user is present according to the user presence signal S3. When the determination result of step S441 is yes, it indicates that the presence sensor 360 has detected the user. The scaler 311 returns to step S430 to continue the mirror mode. On the other hand, when the determination result of step S441 is no, it indicates that the presence sensor 360 has not detected the user. The scaler 311 continues to perform step S442. In step S442, the scaler 311 determines whether a period of time has elapsed after not detecting the user. The period can be, for instance, a preset period. When the determination result of step S442 is yes, it indicates that the user has indeed left the interactive display device 300. The scaler 311 continues to perform step S450. In step S450, the scaler 311 switches the mirror mode to the sleep mode and executes the sleep mode. On the other hand, when the determination result of step S442 is no, the scaler 311 re-performs step S441 to verify again whether the user is still present.

On the other hand, when the interface circuit 320 is connected to the electronic device 200, the scaler 311 performs step S460. In step S460, the scaler 311 detects whether the second image signal S2 is present based on the communication information transmitted by the bridge controller 321. When the determination result of step S460 is no, it indicates that the electronic device 200 is connected to the interactive display device 300, and at the same time, no audio-visual related program is executed, so the second image signal S2 is not output to the interactive display device 300. At this time, the scaler 311 detects that the second image signal S2 is absent and continues to perform step S430 to execute the mirror mode.

When the determination result of step S460 is yes, it indicates that the electronic device 200 is connected to the interactive display device 300, and at the same time, an audio-visual related program is being executed and the second image signal S2 is output to the interactive display device 300. The scaler 311 detects that the second image signal S2 is present and continues to perform step S470 to execute the normal display mode or the hybrid mode according to whether the multi-window mode is enabled or not. The multi-window mode can be, for instance, a picture-in-picture (PIP) mode, including sub-window display mode such as the PIP mode and side-by-side display mode such as a picture-by-picture (PBP) mode.

Specifically, in step S470, the scaler 311 detects whether the multi-window mode set by the electronic device 200 for the interactive display device 300 is enabled through the communication information transmitted by the bridge controller 321. When the determination result of step S470 is yes, the scaler 311 continues to perform step S480 to execute the hybrid mode. When the determination result of step S470 is no, the scaler 311 continues to perform step S490 to execute the normal display mode.

Figure 5:
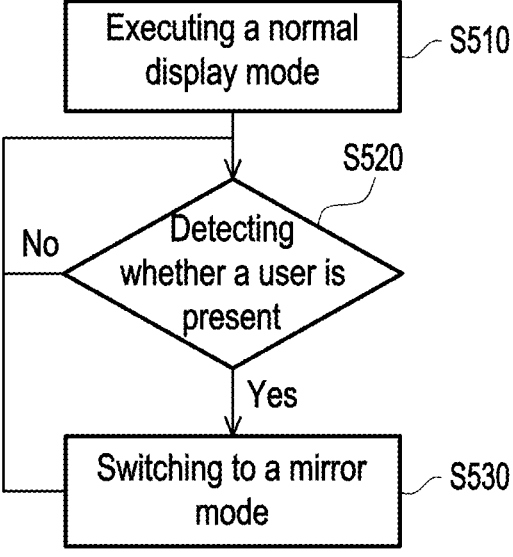
FIG. 5 is a flowchart of an interactive display method according to the embodiment depicted in FIG. 3.

FIG. 5 is a flowchart of an interactive display method according to the embodiment depicted in FIG. 3. With reference to FIG. 3 and FIG. 5, the interactive display device 300 performs steps S510 to S530 through the scaler 311 in the display 310 to spontaneously determine whether to switch to the magic mirror display application in the normal display mode. Steps S510 to S530 can be, for instance, exemplary detailed steps in step S490 depicted in FIG. 4.

In step S510, the scaler 311 executes the normal display mode.

In step S520, in the normal display mode, the scaler 311 detects whether the user is present through the presence sensor 360 to determine whether to switch the normal display mode to the mirror mode according to the user presence signal S3 generated by the presence sensor 360. When the determination result of step S520 is yes, it indicates that the presence sensor 360 has detected the user. The scaler 311 switches the normal display mode to the mirror mode and executes the mirror mode. On the other hand, when the determination result of step S520 is no, the scaler 311 re-performs step S520 to verify again whether the user is still present.

Figure 6:
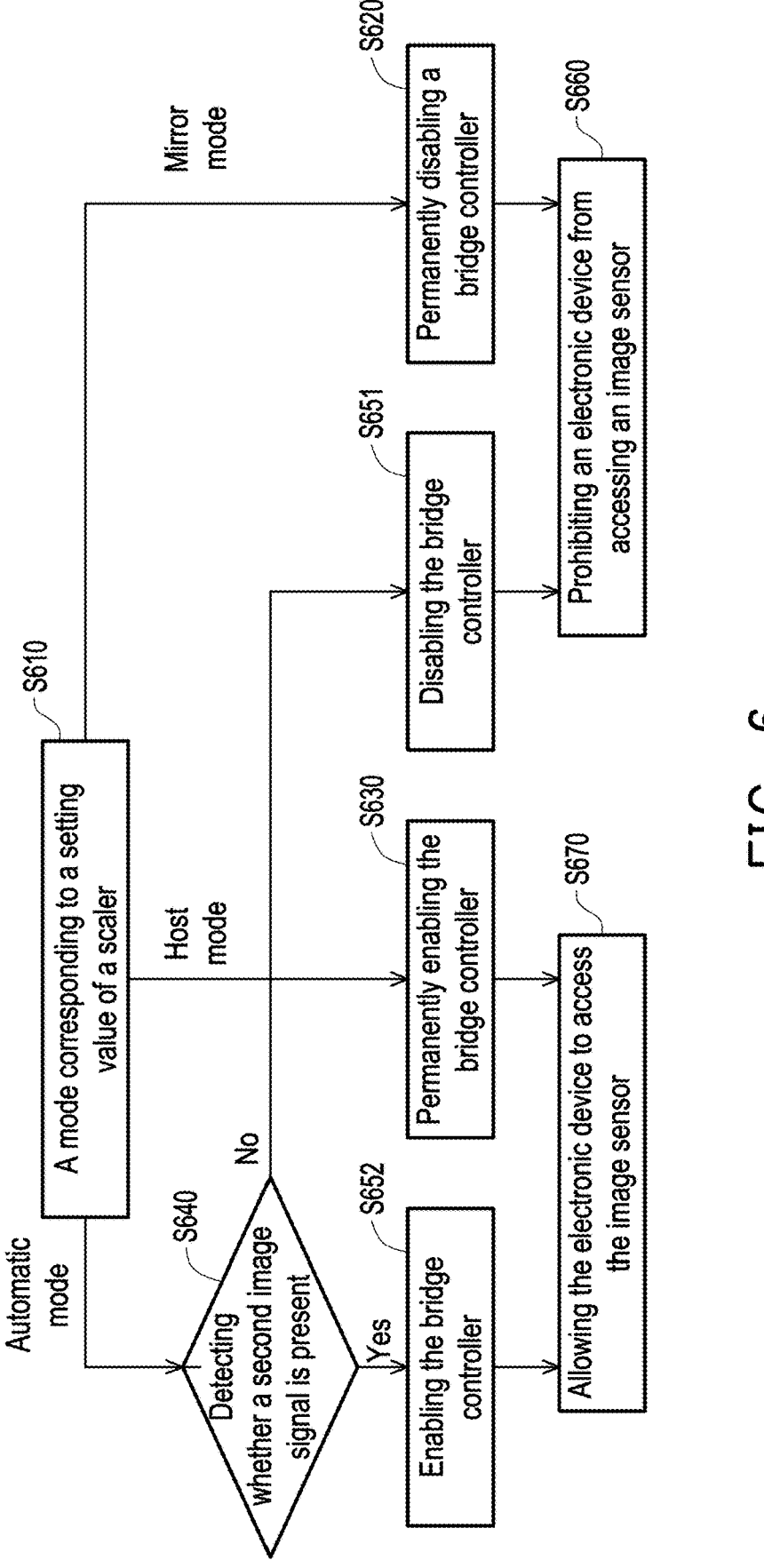
FIG. 6 is a flowchart of an interactive display method according to the embodiment depicted in FIG. 3.

FIG. 6 is a flowchart of an interactive display method according to the embodiment depicted in FIG. 3. With reference to FIG. 3 and FIG. 6, the interactive display device 300 performs steps S610 to S670 through the scaler 311 in the display 310 to set the operation status of the interface circuit 320 based on the setting value of the scaler 311 to implement the mirror mode, the hybrid mode, and the normal display mode described in the embodiment depicted in FIG. 4.

In step S610, the scaler 311 confirms the mode corresponding to its own setting value. The mode can be, for instance, a mirror mode corresponding to the mirror mode described in FIG. 4, a host mode, or an automatic mode corresponding to the hybrid mode and the normal display mode described in FIG. 4.

In the mirror mode, the scaler 311 performs steps S620 and S660. In step S620, the scaler 311 sets the operation status of the interface circuit 320 by permanently disabling the bridge controller 321. In step S660, based on the operation status, the scaler 311 prohibits the electronic device 200 from accessing the image sensor 330 through the bridge controller 321. As such, the user can use the image sensor 330 as a mirror to view the image captured by the image sensor 330 (i.e., the first image signal S1) on the panel 312, such as the user's facial image. At the same time, the image may not be accessed by the electronic device 200. Therefore, the scaler 311 can ensure the user privacy.

In the host mode, the scaler 311 performs steps S630 and S670. In step S630, the scaler 311 sets the operation status of the interface circuit 320 by permanently enabling the bridge controller 321. In step S670, based on the operation status, the scaler 311 allows the electronic device 200 to access the image sensor 330 through the bridge controller 321. As such, the user can operate the electronic device 200 to control the interactive display device 300.

In the automatic mode, the scaler 311 performs steps S640, S651 to S652, and S660 to S670. In step S640, the scaler 311 detects whether the second image signal S2 is present through the communication information transmitted by the bridge controller 321. When the determination result of step S640 is no, it indicates that the electronic device 200 is connected to the interactive display device 300, and at the same time, is not executing an audio-visual related program and is not outputting the second image signal S2 to the interactive display device 300. The scaler 311 performs step S651 to set the operation status of the interface circuit 320 by disabling the bridge controller 321. Based on the operation status, the scaler 311 performs step S660 to continue the mirror mode.

On the other hand, when the determination result of step S640 is yes, it indicates that the electronic device 200 is connected to the interactive display device 300, and at the same time, is executing an audio-visual related program and outputting the second image signal S2 to the interactive display device 300. The scaler 311 performs step S652 to set the operation status of the interface circuit 320 by enabling the bridge controller 321. Based on the operation status, the scaler 311 performs step S670 to allow the electronic device 200 to access the image sensor 330 and continues the normal display mode or the hybrid mode. In the hybrid mode, the scaler 311 further executes the multi-window mode.

Figure 7:
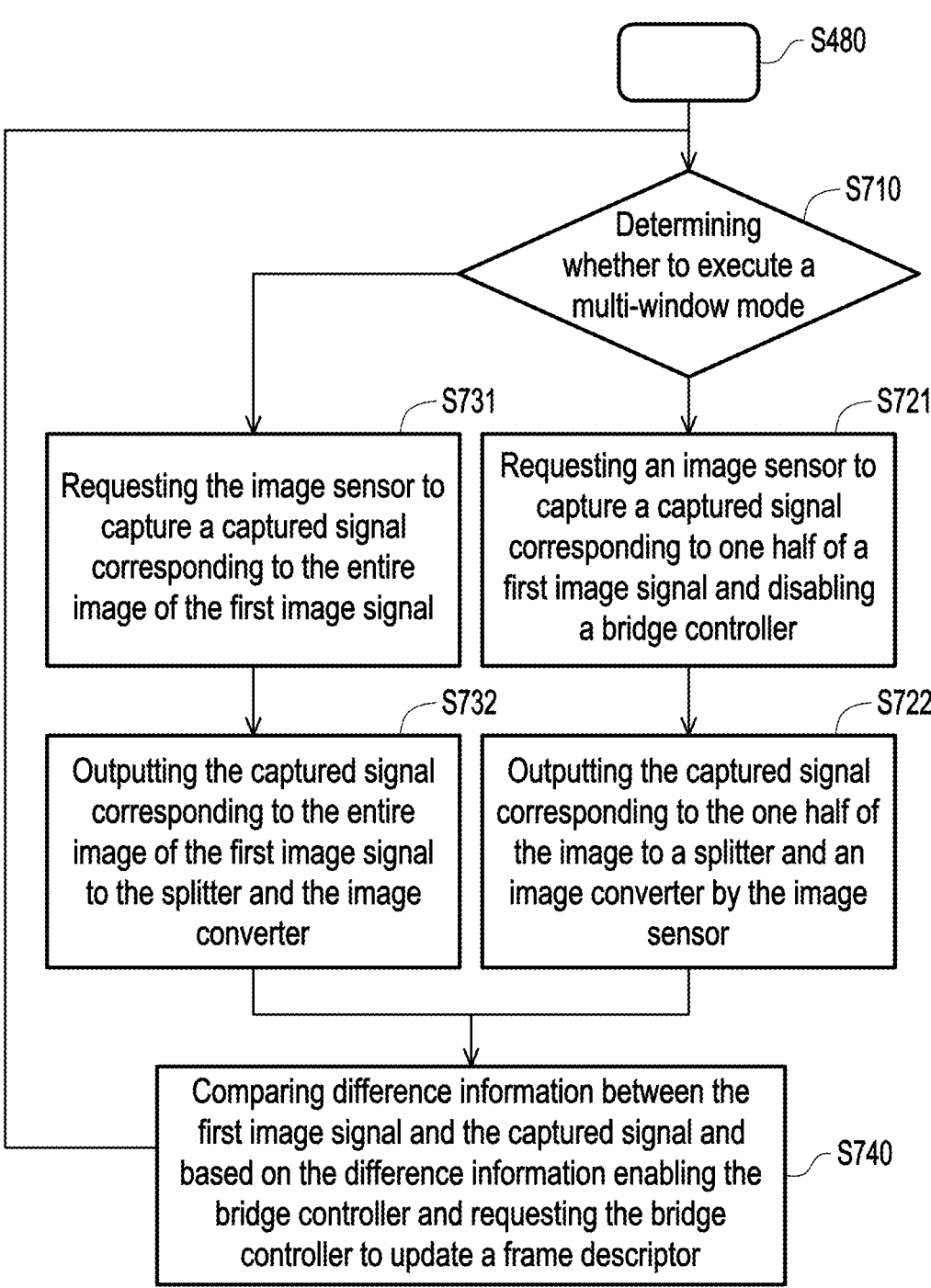
FIG. 7 is a flowchart of an interactive display method according to the embodiment depicted in FIG. 3.

FIG. 7 is a flowchart of an interactive display method according to the embodiment depicted in FIG. 3. With reference to FIG. 3 and FIG. 7, the interactive display device 300 performs steps S710 to S740 through the scaler 311 in the display 310 to execute the hybrid mode described in the embodiment depicted in FIG. 4. Steps S710 to S740 can be, for instance, exemplary detailed steps of step S480 depicted in FIG. 4.

In step S710, the scaler 311 determines whether the display 310 executes the multi-window mode through the communication information transmitted by the bridge controller 321. When the determination result of step S710 is yes, the scaler 311 continues to perform steps S721 to S722 and S740 to execute the multi-window mode in the hybrid mode.

In step S721, the scaler 311 requests the image sensor 330 to capture a captured signal corresponding to one half of the first image signal S1. The scaler 311 further sets the operation status of the interface circuit 320 by disabling the bridge controller 321 to prohibit the electronic device 200 from accessing the image sensor 330. That is, in the multi-window mode, the scaler 311 requests the image sensor 330 to capture the middle half of the captured image (i.e., the first image signal S1) as the captured signal. At the same time, the scaler 311 disables the bridge controller 321 to terminate the access permission of the electronic device 200 to the image sensor 330.

In step S722, the image sensor 330 outputs the captured signal corresponding to the one half of the image to the splitter 350, so as to transmit the captured signal to the image converter 340 through the splitter 350. The image converter 340 performs format conversion on the captured signal to output the corresponding signal to the scaler 311.

In step S740, in the multi-window mode, the scaler 311 compares the difference information between the image captured by the image sensor 330 (i.e., the first image signal S1) and the one half of the image captured in step S722 (i.e., the captured signal). The scaler 311 enables the bridge controller 321 based on the difference information to update the operation status of the interface circuit 320 and requests the bridge controller 321 to update a frame descriptor. That is, when the scaler 311 detects a change in the image provided by the image sensor 330, the scaler 311 knows that the image conversion has been completed and accordingly re-enables the bridge controller 321. At the same time, the scaler 311 informs the bridge controller 321 that the current screen image used as PIP has a different resolution, and the bridge controller 321 needs to update the USB description. As such, the electronic device 200 executes the program corresponding to the multi-window mode (e.g., video conferencing) according to the updated frame descriptor, so as to normally execute the program to achieve the PIP function.

In another aspect, when the determination result in step S710 is no, the scaler 311 continues to perform steps S731 to S732 and S740 to not execute the multi-window mode in the hybrid mode. In step S731, the scaler 311 requests the image sensor 330 to capture a captured signal corresponding to the entire image of the first image signal S1. The scaler 311 also sets the operation status of the interface circuit 320 by disabling the bridge controller 321 to temporarily terminate the electronic device 200 from accessing the image sensor 330. In step S732, the image sensor 330 outputs the captured signal corresponding to the entire image of the first image signal S1 to the splitter 350, so as to transmit the captured signal to the image converter 340 through the splitter 350. The image converter 340 performs format conversion on the captured signal to output the corresponding signal to the scaler 311. In step S740, in the non-multi-window mode, the scaler 311 operates based on the difference information between the image captured by the image sensor 330 (i.e., the first image signal S1) and the entire image captured in step S732 (i.e., the captured signal). As such, the electronic device 200 can normally execute the conferencing program without achieving the PIP function.

Figure 8B:
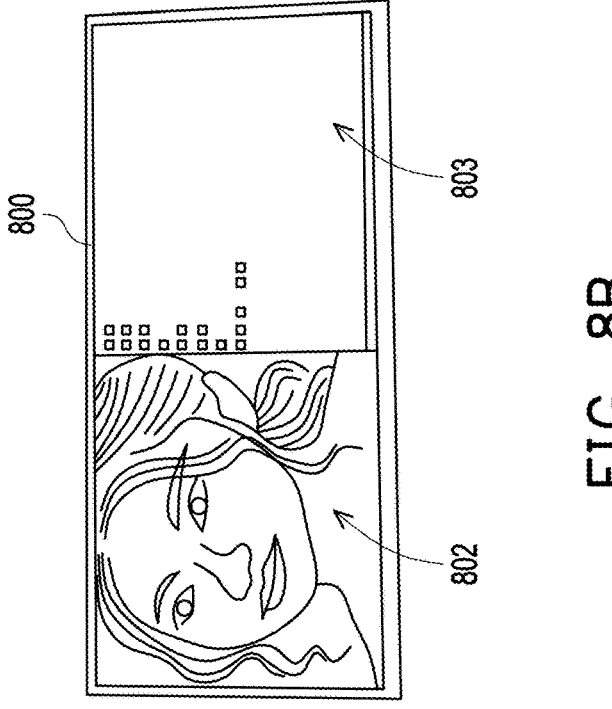
FIG. 8A and FIG. 8B are schematic operational diagrams illustrating an interactive display method according to the embodiment depicted in FIG. 3.
Figure 8A:
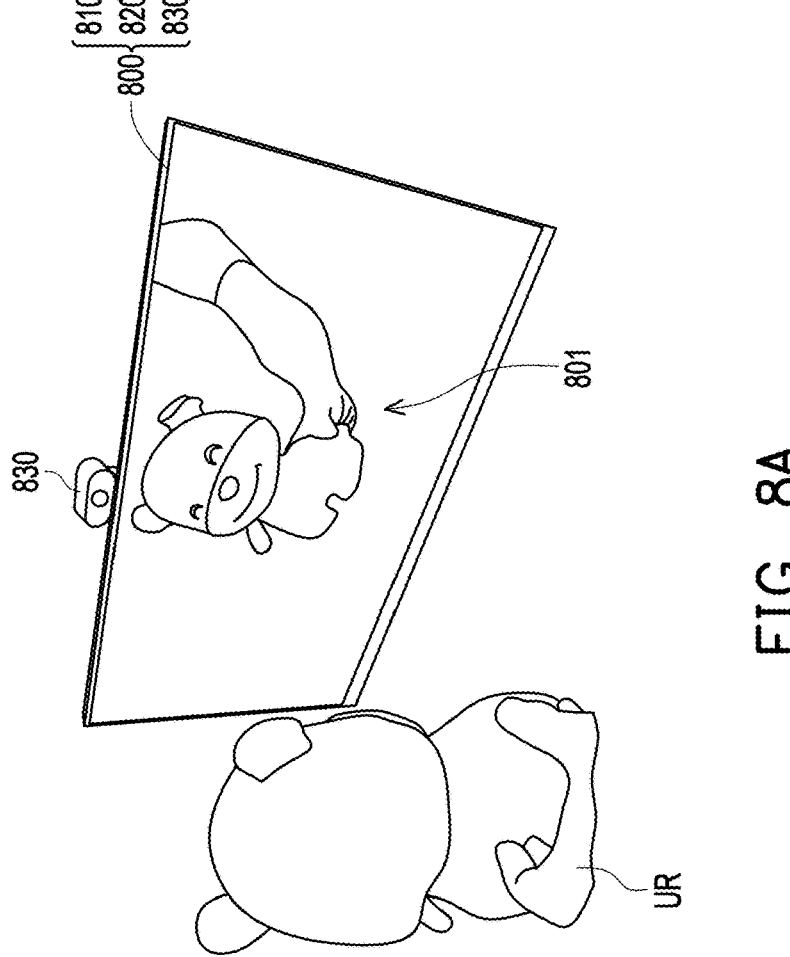

FIG. 8A and FIG. 8B are schematic operational diagrams illustrating an interactive display method according to the embodiment depicted in FIG. 3. With reference to FIG. 8A and FIG. 8B, the interactive display device 800 includes a display 810, an interface circuit 820, and an image sensor 830, and the display 810, the interface circuit 820, and the image sensor 830 can be understood by referring to and being deduced from the related description of the interactive display device 300.

In the embodiment depicted in FIG. 8A, the image sensor 830 is externally connected to a panel of the display 810. It is assumed that a user UR is present, and the display 810 executes the mirror mode. In the mirror mode, the display 810 can perform mirror inversion on the image captured by the image sensor 830 (i.e., the first image signal) through the scaler to generate an inverted image signal. The scaler displays the output image 801 according to the inverted image signal. As such, the display 810 can normally display the image captured by the image sensor 830.

In the embodiment depicted in FIG. 8B, the interactive display device 800 executes the multi-window mode. In the multi-window mode, the display 810 can simultaneously display a half-screen image 802 provided by the image sensor 830 and a video screen 803 from the electronic device.

To sum up, in the interactive display device and the interactive display method provided in one or more embodiments of the disclosure, the operation status of the interface circuit is set based on whether the video image is present, thereby controlling the access permission of the electronic device and further eliminating the dependency on the electronic device. As such, the interactive display device can directly use the camera to achieve the magic mirror display function without connecting the electronic device and can support the PIP mode to self-achieve the magic mirror display function when connected to the electronic device. The interactive display device can further protect user privacy and simultaneously optimize aesthetics and visual quality during use, thereby enhancing user experience and convenience with immediacy.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An interactive display device, comprising:
   an image sensor, configured to generate a first image signal;
   an interface circuit, coupled to an electronic device and configured to transmit a second image signal from the electronic device; and
   a display, coupled to the image sensor and the interface circuit and configured to:
   set an operation status of the interface circuit according to a user presence signal and the second image signal; and
   based on the operation status, display an output image according to at least one of the first image signal and the second image signal.

2. The interactive display device according to claim 1, wherein the display comprises:
   a panel, configured to display the output image; and
   a scaler, coupled to the panel, the image sensor, and the interface circuit and configured to determine whether the interface circuit is connected to the electronic device to set the operation status based on the user presence signal and the second image signal.

3. The interactive display device according to claim 2, further comprising:
   an image converter, coupled to the scaler and configured to transmit the first image signal to the scaler according to a plurality of image formats; and
   a splitter, coupled to the interface circuit, the image sensor, and the image converter and configured to distribute the first image signal to the interface circuit and the image converter.

4. The interactive display device according to claim 3, wherein the interface circuit comprises:
   at least one input interface, configured to generate a user input signal;
   a hub interface, coupled to the at least one input interface and the electronic device, and configured to transmit the user input signal and the second image signal; and
   a bridge controller, coupled to the hub interface, the scaler, and the splitter, wherein the scaler is configured to set the operation status by enabling or disabling the bridge controller to prohibit or allow the electronic device to access the image sensor.

5. The interactive display device according to claim 1, further comprising:
   a presence sensor, coupled to the display and configured to generate the user presence signal.

6. The interactive display device according to claim 1, wherein the display is further configured to:
   when the interface circuit is not connected to the electronic device, execute a mirror mode; and
   in the mirror mode, detect whether a user is present through a presence sensor within a period of time to determine whether to switch the mirror mode to a sleep mode based on the user presence signal.

7. The interactive display device according to claim 6, wherein the display is further configured to:
   when the interface circuit is connected to the electronic device, detect an absence of the second image signal to execute the mirror mode; and
   when the interface circuit is connected to the electronic device, detect a presence of the second image signal to execute a normal display mode or a hybrid mode according to whether a multi-window mode is enabled or not.

8. The interactive display device according to claim 7, wherein the display is further configured to:
   in the normal display mode, detect whether the user is present through the presence sensor to determine whether to switch the normal display mode to the mirror mode according to the user presence signal.

9. The interactive display device according to claim 7, wherein the display is further configured to:

in the mirror mode, set the operation status by disabling a bridge controller of the interface circuit to prohibit the electronic device from accessing the image sensor;

in the normal display mode, set the operation status by enabling the bridge controller to allow the electronic device to access the image sensor; and in the hybrid mode, execute the multi-window mode.

10. The interactive display device according to claim 9, wherein when the display executes the multi-window mode, the display is further configured to:

request the image sensor to capture a captured signal corresponding to one half of the first image signal; and set the operation status by disabling the bridge controller to prohibit the electronic device from accessing the image sensor.

11. The interactive display device according to claim 10, wherein when the display executes the multi-window mode, the display is further configured to:

compare difference information between the first image signal and the captured signal;

according to the difference information, enable the bridge controller to update the operation status; and according to the difference information, request the bridge controller to update a frame descriptor to allow the electronic device to execute a program corresponding to the multi-window mode according to the frame descriptor.

12. The interactive display device according to claim 6, wherein the image sensor is externally connected to the display, wherein in the mirror mode, the display is further configured to perform mirror inversion on the first image signal to generate an inverted image signal and display the output image according to the inverted image signal.

13. An interactive display method, comprising:

generating a first image signal by an image sensor;

transmitting a second image signal from an electronic device by an interface circuit;

setting an operation status of the interface circuit by a display according to a user presence signal and the second image signal; and based on the operation status, displaying an output image by the display according to at least one of the first image signal and the second image signal.

14. The interactive display method according to claim 13, further comprising:

executing a mirror mode by the display when the interface circuit is not connected to the electronic device; and in the mirror mode, detecting whether a user is present through a presence sensor by the display within a period of time to determine whether to switch the mirror mode to a sleep mode based on the user presence signal.

15. The interactive display method according to claim 14, further comprising:

when the interface circuit is connected to the electronic device, detecting an absence of the second image signal by the display to execute the mirror mode; and when the interface circuit is connected to the electronic device, detecting a presence of the second image signal by the display to execute a normal display mode or a hybrid mode according to whether a multi-window mode is enabled or not.

16. The interactive display method according to claim 15, further comprising:

in the normal display mode, detecting whether the user is present through the presence sensor by the display to determine whether to switch the normal display mode to the mirror mode according to the user presence signal.

17. The interactive display method according to claim 16, further comprising:

in the mirror mode, setting the operation status by the display through disabling a bridge controller of the interface circuit to prohibit the electronic device from accessing the image sensor;

in the normal display mode, setting the operation status by the display through enabling the bridge controller to allow the electronic device to access the image sensor; and in the hybrid mode, executing the multi-window mode by the display.

18. The interactive display method according to claim 17, wherein the step of executing the multi-window mode by the display in the hybrid mode comprises:

requesting the image sensor by the display to capture a captured signal corresponding to one half of the first image signal; and setting the operation status by the display through disabling the bridge controller to prohibit the electronic device from accessing the image sensor.

19. The interactive display method according to claim 18, wherein the step of executing the multi-window mode by the display in the hybrid mode further comprises:

comparing difference information between the first image signal and the captured signal by the display;

according to the difference information, enabling the bridge controller by the display to update the operation status; and according to the difference information, requesting the bridge controller by the display to update a frame descriptor, so that the electronic device executes a program corresponding to the multi-window mode according to the frame descriptor.

20. The interactive display method according to claim 16, further comprising:

in the mirror mode, performing mirror inversion on the first image signal by the display to generate an inverted image signal; and in the mirror mode, displaying the output image by the display according to the inverted image signal, wherein the image sensor is externally connected to the display.

* * * * *